United States Patent
Ye et al.

(10) Patent No.: US 11,925,956 B2
(45) Date of Patent: Mar. 12, 2024

(54) PREPARATION METHOD FOR DOUBLE-LAYER WORKING MEDIUM TARGET TAPE WITH PLASMA-ENHANCED INTERFACIAL BONDING FORCE FOR MICRO LASER THRUSTER

(71) Applicant: Space Engineering University, Beijing (CN)

(72) Inventors: Jifei Ye, Beijing (CN); Baoyu Xing, Beijing (CN); Yanji Hong, Beijing (CN); Sibo Wang, Beijing (CN); Nanlei Li, Beijing (CN)

(73) Assignee: Space Engineering University, Beijing (CN)

( * ) Notice: Subject to any disclaimer, the term of this patent is extended or adjusted under 35 U.S.C. 154(b) by 0 days.

(21) Appl. No.: 17/964,326

(22) Filed: Oct. 12, 2022

(65) Prior Publication Data
US 2024/0033778 A1    Feb. 1, 2024

(30) Foreign Application Priority Data
Jul. 29, 2022   (CN) .......................... 202210908998X

(51) Int. Cl.
*B05D 3/00*    (2006.01)
*B05D 3/10*    (2006.01)
*B05D 3/14*    (2006.01)

(52) U.S. Cl.
CPC ............. *B05D 3/144* (2013.01); *B05D 3/101* (2013.01); *B05D 2201/02* (2013.01)

(58) Field of Classification Search
CPC ..... B05D 3/144; B05D 3/101; B05D 2201/02
See application file for complete search history.

(56) References Cited

U.S. PATENT DOCUMENTS

2007/0287017 A1* 12/2007 Sargeant ................. C23C 14/20
                                                            427/296

FOREIGN PATENT DOCUMENTS

WO     WO2017072694    *  5/2017

\* cited by examiner

*Primary Examiner* — Nathan T Leong

(57) ABSTRACT

Provided is a preparation method for a double-layer working medium target tape with a plasma-enhanced interfacial bonding force for a micro laser thruster. Aiming at the problem that in an existing micro laser thruster, when a working medium is ablated by a laser beam, due to a weak interlayer interfacial bonding force between a transparent film substrate and the coating working medium, sputtering or bulging occurs, which remarkably reduces propulsive performance, a method for treating a surface of a transparent film substrate with a low-temperature plasma is used to increase surface energy of a film and an adhesive force of a working medium layer on a surface of the film, thereby enhancing the interlayer interfacial bonding force. According to the method in the present disclosure, the transparent film substrate is treated with the low-temperature plasma.

6 Claims, 16 Drawing Sheets

PREPARATION METHOD FOR DOUBLE-LAYER WORKING MEDIUM TARGET TAPE WITH PLASMA-ENHANCED INTERFACIAL BONDING FORCE FOR MICRO LASER THRUSTER

CROSS-REFERENCE TO RELATED APPLICATIONS

This application claims priority from the Chinese patent application 2022109008998X filed Jul. 29, 2022, the content of which is incorporated herein in the entirety by reference.

TECHNICAL FIELD

The present disclosure belongs to the technical field of satellite propulsion, and relates to a plasma treatment based preparation method for a working medium target tape for a micro laser thruster.

BACKGROUND ART

Being used for attitude and orbit control of a satellite, a laser propulsion technology is used for forming an ablation plume sprayed at a high temperature, under a high pressure and at a high speed by ablating a working medium by a pulse laser beam having high power density, so as to convert laser energy into plume kinetic energy, thereby generating thrust.

In a micro laser thruster, an ablation working medium target tape is of a double-layer target tape structure in which a transparent film substrate is coated with an ablation working medium. A laser in the micro laser thruster emits a pulse laser beam to penetrate the transparent substrate to ablate the coating working medium, so as to generate thrust. At first, the transparent film, which is made from a material having excellent light transmission, is used for transmitting a laser beam and preventing the situation that an ablation plume is reversely sprayed to dirty a lens of the laser. Then, the coating working medium is made from a material having desirable laser ablation performance, an impulse generated by consuming unit laser energy is called impulse coupling performance, and the coating working medium should have desirable impulse coupling performance. Finally, in the micro laser thruster, the laser energy is injected between the transparent substrate and the coating working medium to ablate the working medium such that the ablation plume may be sprayed in a direction of an incident laser beam. Under the conditions that laser parameters and a coating working medium have been selected, an interfacial bonding force between the transparent substrate and the coating working medium has significant impacts on a specific impulse, an impulse bit and propulsive efficiency of the micro laser thruster.

When the pulse laser beam penetrates the transparent substrate to be focused between the transparent substrate and the coating working medium to ablate the coating working medium, the ablation plume sprayed at a high temperature, under a high pressure and at a high speed is generated. The ablation plume has the following three situations: firstly, the working medium around a focal spot of the laser beam (the focal spot of the laser beam is tens of microns) is ablated rapidly and uniformly to generate uniform and fine ablation particles, which is a situation that propulsive performance is better. Secondly, a reaction force of the plume on the transparent substrate causes interlayer peeling between the transparent substrate and the coating working medium, such that a large ablation region is formed, and sputtering of the coarse ablation particles occurs, which remarkably reduces the propulsive performance Thirdly, the reaction force of the plume on the transparent substrate will cause interlayer tearing between the transparent substrate and the coating working medium, such that bulging of the ablation working medium occurs, and the ablation plume is not sprayed, which is the worst situation. Therefore, in order to improve the propulsive performance of the micro laser thruster, it is an effective technological approach to improve the interfacial bonding force between the transparent film substrate and the coating working medium to prevent interlayer peeling or tearing, so as to prevent sputtering or bulging.

At present, the main defects of the double-layer target tape of which the transparent substrate is coated with the ablation working medium are as follows:

(1) Due to a weak interlayer interfacial bonding force between the transparent substrate and the coating ablation working medium, interlayer peeling or tearing occurs when the coating working medium is ablated by the laser beam, such that sputtering or bulging occurs, which remarkably reduces the propulsive performance.

(2) On account of the weak interlayer interfacial bonding force, it is difficult to make full use of an adjustment action of laser parameters and coating working medium parameters on the propulsive performance.

SUMMARY

According to the present disclosure, aiming at the problem that in an existing micro laser thruster, when a working medium is ablated by a laser beam, due to a weak interlayer interfacial bonding force between a transparent film substrate and the coating working medium, sputtering or bulging occurs, which remarkably reduces propulsive performance, a method for treating a surface of a transparent film substrate with a low-temperature plasma is used to increase surface energy of a film and an adhesive force of a working medium layer on a surface of the film, thereby enhancing the interlayer interfacial bonding force. After being subjected to low-temperature plasma treatment, the surface of the transparent film substrate is coated with an ablation working medium to form a double-layer target tape, and by enhancing the interlayer bonding force between the transparent substrate and the coating working medium, a solid double-layer working medium target tape having a high specific impulse and a high impulse bit is provided for the micro laser thruster.

According to the present disclosure, a low-temperature plasma treatment technology is transplanted and applied to surface modification of the transparent film substrate of the micro laser thruster, so as to overcome the above defects. At first, part of original C—H bonds on the surface of the transparent film substrate are disconnected to be combined with ionized 0 atoms and N atoms to form C—N, N—C=O or C=O active groups, such that surface energy of the transparent film substrate is increased. Then, the surface of the transparent film substrate subjected to plasma treatment is coated with an ablation working medium, such that the interfacial bonding force between the transparent film substrate and the coating working medium is enhanced. Further, a low-temperature plasma treatment region only covers a range of several nanometers to hundreds of nanometers of the surface of the transparent substrate such that light transmission of a substrate material may not be influenced. Therefore, a method for enhancing an interfacial bonding force by means of a low-temperature plasma may effectively inhibit sputtering or bulging in a process of ablating a working medium by a laser beam, thereby improving propulsive performance of the micro laser thruster. The present disclosure employs the following technical solutions:

A plasma treatment based preparation method for a working medium target tape for a micro laser thruster includes the following steps:

step 1) treating a surface of a transparent polymer film substrate by a plasma; and step 2) coating the surface of the transparent polymer film substrate subjected to the plasma treatment with working medium slurry.

Optionally, the surface of the transparent film substrate is coated with the working medium slurry within 5 s after being treated by the plasma.

Optionally, the transparent polymer film substrate is a polymer film with a single surface coated with silicon. In the step 1), a surface not coated with the silicon of the transparent polymer film substrate is treated by the plasma.

Optionally, the transparent polymer film substrate has a thickness ranging from 20 μm to 200 μm.

Optionally, the transparent polymer film substrate has a width ranging from 5 cm to 15 cm.

Optionally, the transparent polymer film substrate is a polyethylene terephthalate film or a polyimide film.

Optionally, in the step 1), the transparent polymer film substrate is subjected to cleaning pretreatment.

Optionally, the cleaning pretreatment is to clean the surface of the transparent polymer film substrate with ethanol, and after being air-dried, the transparent polymer film substrate is dried at a temperature of 40° C. for later use.

Optionally, in the step 2), after coating is completed, the slurry is dried at a temperature of 40° C.

Optionally, the plasma is made from at least one of air, argon, nitrogen or oxygen.

Optionally, low-temperature plasma treatment power ranges from 1000 W to 2000 W; a transparent polymer film substrate transmission speed ranges from 1 m/min to 4 m/min; and a gas pressure ranges from 80 kPa to 120 kPa, and a low-temperature plasma treatment region has an area ranging from 150 cm$^2$ to 300 cm$^2$.

According to the working medium target tape for the micro laser thruster prepared through the above preparation method, a low-temperature plasma treatment technology is transplanted and applied to surface modification of the transparent film substrate of the micro laser thruster, so as to overcome the above defects. At first, part of original C—H bonds on the surface of the transparent film substrate are disconnected to be combined with ionized 0 atoms and N atoms to form C—N, N—C═O or C═O active groups, such that surface energy of the transparent film substrate is increased. Then, the surface of the transparent film substrate subjected to plasma treatment is coated with an ablation working medium, such that the interfacial bonding force between the transparent film substrate and the coating working medium is enhanced. Further, a low-temperature plasma treatment region only covers a range of several nanometers to hundreds of nanometers of the surface of the transparent substrate such that light transmission of a substrate material may not be influenced. Therefore, a method for enhancing an interfacial bonding force by means of a low-temperature plasma may effectively inhibit sputtering or bulging in a process of ablating a working medium by a laser beam, thereby improving propulsive performance of the micro laser thruster.

The present disclosure further provides a preparation device for a working medium target tape for a micro laser thruster. The preparation device includes a low-temperature plasma treatment device and a slurry coating device, and a transparent polymer film substrate penetrates the low-temperature plasma treatment device to enter the slurry coating device.

Optionally, a transparent polymer film substrate transmission speed in the low-temperature plasma treatment device is the same as that in the slurry coating device.

Optionally, the low-temperature plasma treatment device includes an electric discharge roller and a corundum discharge electrode matching the electric discharge roller, and the transparent polymer film passes through a space between the electric discharge roller and the corundum discharge electrode.

A specific technical solution will be introduced below:

step (1) carrying out cleaning pretreatment on a transparent film substrate;

step (2) adjusting power of a plasma treatment station and a transmission speed of a coating machine, where the low-temperature plasma treatment power ranges from 1000 W to 2000 W, and the transmission speed ranges from 1 m/min to 4 m/min;

step (3) carrying out low-temperature plasma treatment on the transparent film substrate during transmission, and directly spraying a plasma to a surface of the transparent film substrate, such that the transparent film substrate is transmitted at a normal temperature, under a normal pressure and in the presence of the plasma, thereby enhancing interfacial bonding force; and step (4) transmitting the transparent film substrate subjected to the low-temperature plasma treatment to a blade coater, uniformly blade-coating a plasma-treated surface with working medium slurry, where a plasma treatment process of the substrate film and a coating process of the working medium slurry are synchronously carried out, and after a working medium layer is dried and formed, a double-layer working medium target tape having strong interfacial bonding force is obtained.

The transparent film substrate in the step (1) is a polyethylene terephthalate film or a polyimide film which is a commercial product, the transparent film substrate has a thickness ranging from 20 μm to 200 μm, and the transparent film substrate is a film with a single surface coated with silicon.

The specific steps of the carrying out cleaning pretreatment on a transparent film substrate in the step (1) are as follows: cleaning the surface of the transparent film substrate by means of cotton dipped with absolute ethanol, so as to enhance the effect of treating the surface of the transparent film substrate with the low-temperature plasma, rapidly air-drying, by an air dryer, the surface of the transparent film substrate cleaned by means of the absolute ethanol, and storing the transparent film substrate in a constant-temperature drying oven at 40° C., so as to reduce secondary pollution on the surface of the transparent film substrate.

The low-temperature plasma treatment power in the step (2) ranges from 1000 W to 2000 W, and the transmission speed of the coating machine ranges from 1 m/min to 4 m/min.

The plasma in the step (3) is made from one or more of air, argon, nitrogen or oxygen, where the argon has a mole ratio ranging from 30% to 99.99%, the nitrogen has a mole ratio ranging from 70% to 99.99%, the oxygen has a mole ratio ranging from 30% to 99.99%, and the argon, nitrogen or oxygen has purity of 99.99%; and one or more gases flow through a plasma discharge roller to form the plasma.

The transparent film substrate subjected to the low-temperature plasma treatment in the step (4) is immediately connected to a transmission apparatus of the coating machine, and the low-temperature plasma treated surface of the transparent film substrate is coated with the working medium slurry by the blade coater. The transmission apparatus of the low-temperature plasma treatment station is connected to a transmission apparatus of the coating machine such that the surface of the transparent film substrate may be subjected to the low-temperature plasma treatment and be coated with the working medium slurry synchronously. The surface of the transparent film substrate subjected to the low-temperature plasma treatment is exposed in the air within 5 s, such that the situation that active functional groups of the surface of the transparent film substrate are exposed in the air for a long time to be inactivated is prevented, and surface energy of the transparent film substrate is decreased.

In the step (4), a solvent in the working medium slurry is evaporated in a closed normal-pressure environment at 40° C. to obtain a solid working medium target tape.

In the step (4), the thickness of the working medium layer is controlled to range from 50 μm to 200 μm by adjusting a gap between the blade coater and the transparent film substrate, and experiments show that the interfacial bonding force between the working medium layer and the transparent film substrate within this thickness range is basically consistent.

The beneficial effects generated by the present disclosure include:

(1) Aiming at the problem that in an existing micro laser thruster, when a working medium is ablated by a laser beam, due to a weak interlayer interfacial bonding force between a transparent film substrate and the coating working medium, sputtering or bulging occurs, which remarkably reduces propulsive performance, a method for treating a surface of a transparent film substrate with a low-temperature plasma is used to introduce active groups such as C—N, N—C=O or C=O on the surface of the transparent film substrate, thereby enhancing the interlayer interfacial bonding force, and the interlayer interfacial bonding force is enhanced by about 50% compared with a working medium target tape not subjected to plasma treatment.

(2) The method in the present disclosure is strong in process controllability, short in flow, high in automation degree and low in energy consumption, and large-scale continuous preparation may be realized. The working medium target tape produced through this method may be formed in one step, subsequent treatment is not required, and environmental pollution is less.

BRIEF DESCRIPTION OF THE DRAWINGS

FIGS. 5A-5B: Measurement results of contact angles, wherein
FIG. 5A illustrates a contact angle between polyethylene terephthalate (PET) and a liquid glycidyl azide polymer (GAP) that are not subjected to plasma treatment is about 68 degrees;
and FIG. 5B illustrates a contact angle between PET and a liquid GAP that are subjected to plasma treatment is about 25 degrees.

FIGS. 6A-6B: Results of atomic force microscope, wherein FIG. 6A illustrates Untreated samples: PET not subjected to plasma pretreatment has low surface roughness, and a height difference between a highest point and a lowest point is about 8.95 nm and FIG. 6B illustrates Treated samples: PET subjected to plasma pretreatment has a high surface roughness, and a height difference between a highest point and a lowest point is about 129.85 nm.

FIGS. 7A-7D: XPS analysis diagram including different elemental bonds before and after plasma treatment, wherein FIG. 7A illustrates C 1s, FIG. 7B illustrates O 1s, FIG. 7C illustrates Si 2p and FIG. 7D illustrates N 1s.

FIG. 8: Stress results and tensile samples, wherein

FIGS. 10A-10B: Separation phenomena of target tape before and after plasma treatment, wherein FIG. 10A illustrates Target tape not subjected to plasma treatment; and FIG. 10B illustrates Target tape subjected to plasma treatment.

DETAILED DESCRIPTION OF THE EMBODIMENTS

The present disclosure will be further described below in combination with specific implementation steps. These implementation steps are only used for describing the present disclosure, but do not limit the scope of application of the present disclosure.

Figure 2:
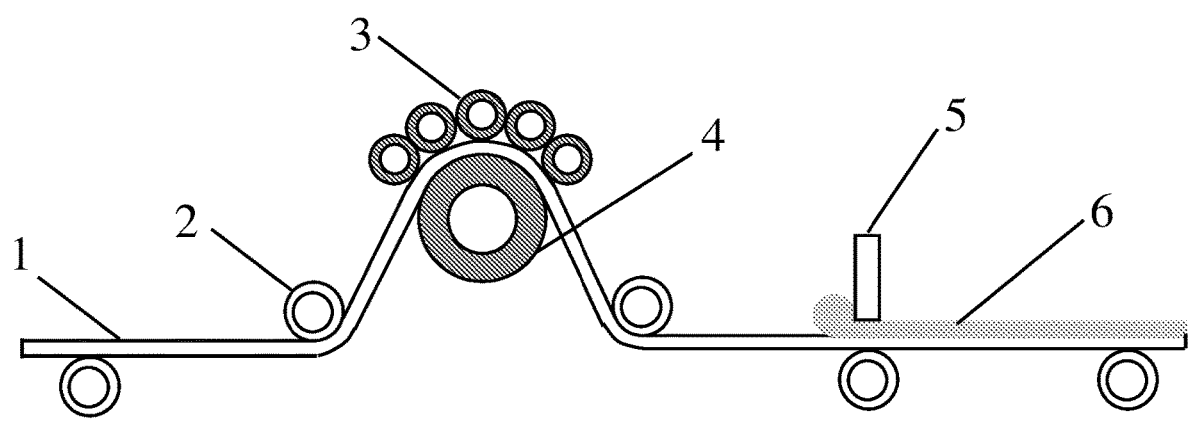
FIG. 2: Schematic diagram of low-temperature plasma treatment; numerals in the figure:
1-transparent film, 2-guide roller, 3-corundum discharge electrode, 4-electric discharge roller, 5-blade coater and 6-working medium
Figure 3:
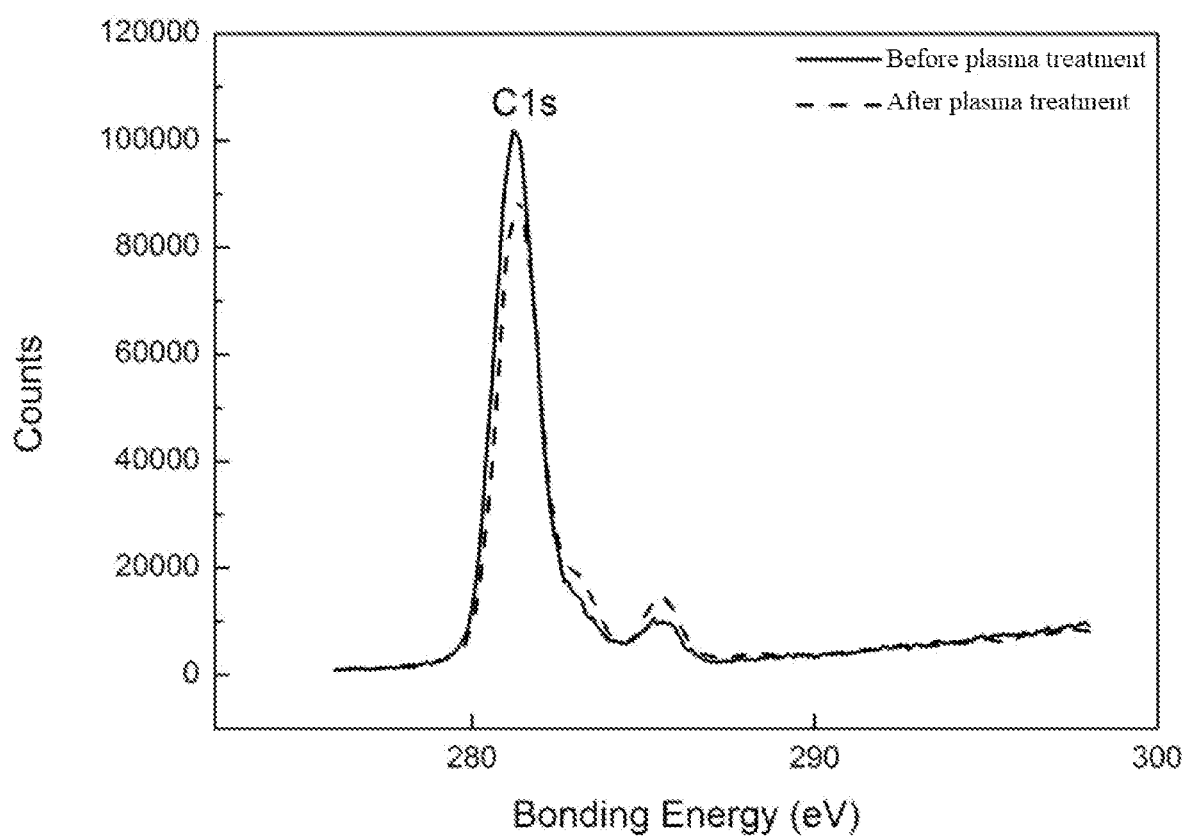
FIG. 3: XPS (x-ray photoelectron spectroscopy) curve of element C in chemical groups of surface before and after plasma treatment
Figure 4:
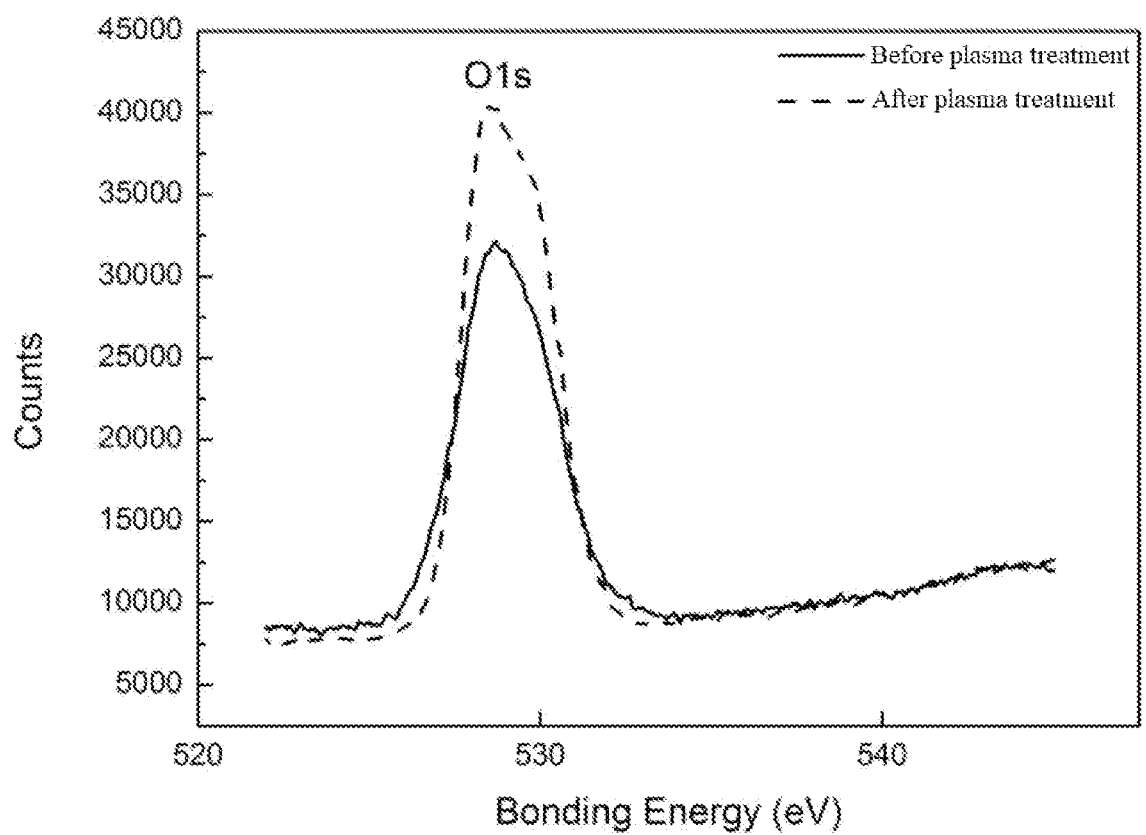
FIG. 4: XPS curve of element O in chemical groups of surface before and after plasma treatment

A processing device in the present disclosure is as shown in FIG. 2, and a transparent film sequentially passes through a low-temperature plasma treatment station and a blade coater. The low-temperature plasma treatment station includes a corundum discharge electrode and an electric discharge roller that are of a sector structure, and that transparent film passes through a space between the corundum discharge electrode and the electric discharge roller.

Figure 1:
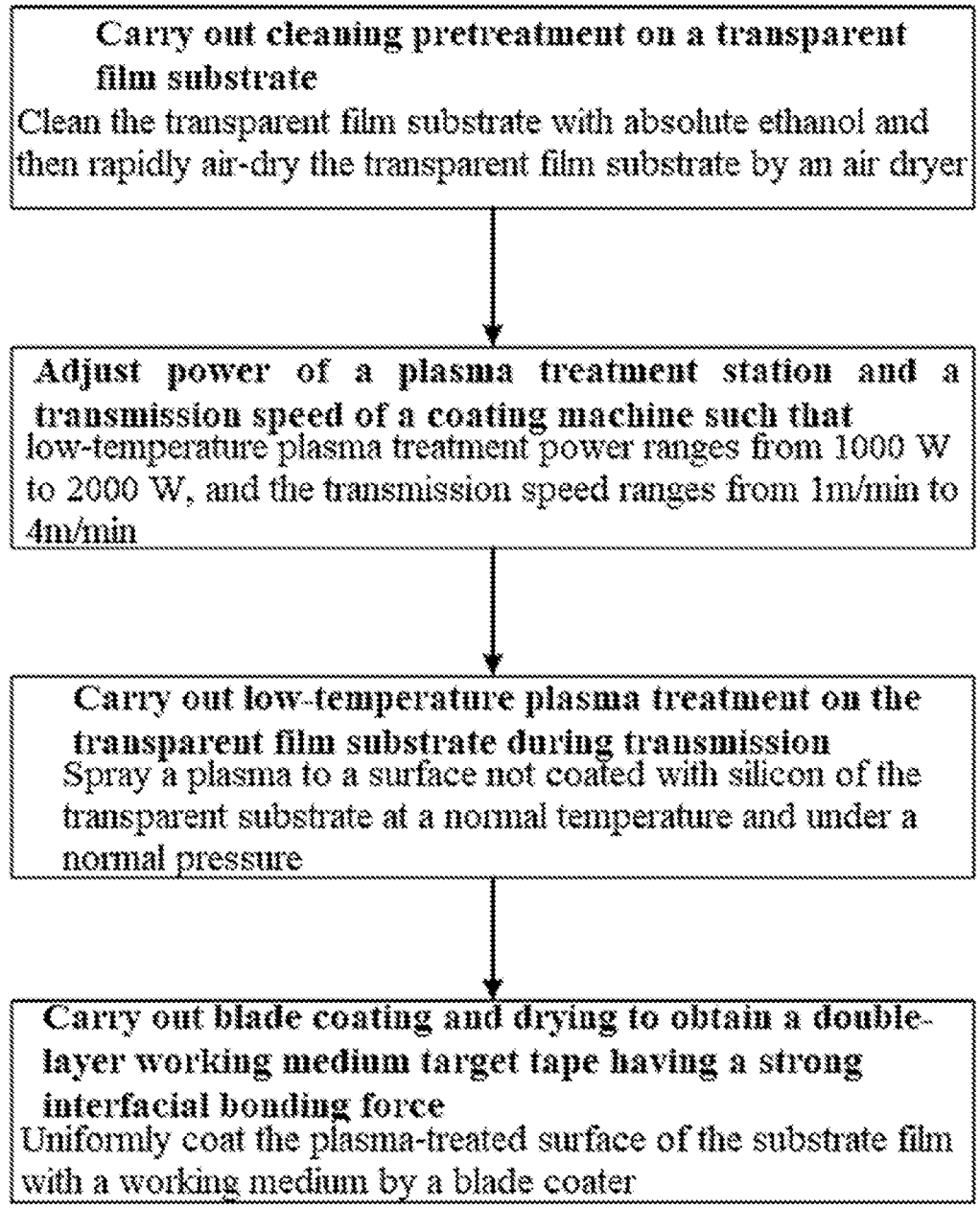
FIG. 1: Flow diagram of preparing double-layer working medium target tape having plasma-enhanced interfacial bonding force

A flow diagram of treating a transparent substrate film with a low-temperature plasma in the present disclosure is as shown in FIG. 1.

1. A wound transparent polyethylene terephthalate (PET) film having a thickness of 50 μm with a single surface coated with silicon is placed on a winding and unwinding device of a coating machine, where a surface not coated with silicon faces upwards. When the transparent PET film is wound and unwound, two surfaces of the transparent PET film are rapidly wiped by means of cotton dipped with absolute ethanol, and the transparent PET film is rapidly air-dried by a hot air blower. After the transparent PET film is cleaned and wound, the transparent PET film is placed in a constant-temperature drying oven to be dried for 2 h at a temperature of 40° C.

2. The wound transparent PET film dried in the step 1 is placed on a special transmission apparatus of a low-temperature plasma treatment station, the transparent PET film is placed between a discharge electrode and a conductive roller, and the surface not coated with silicon faces upwards to be right opposite the discharge electrode. The transparent PET film of 10 cm is moved at a speed of 1.5 m/min at a normal temperature, under a normal pressure and in the presence of an air plasma, plasma treatment power is 1800 W, and a plasma treatment area is 200 cm$^2$.

4. The transparent PET film subjected to low-temperature plasma treatment in the step 2 is connected to a transmission apparatus of the coating machine, after the transparent PET film is subjected to the low-temperature plasma treatment, the plasma-treated surface of the transparent PET film is immediately coated with prepared working medium slurry by a blade coater, and a plasma treatment process of the transparent PET film and a coating process of glycidyl azide polymer (GAP) working medium slurry are synchronously carried out.

5. A working medium target tape after coating is placed in a normal-pressure constant-temperature drying oven to be slowly dried, a temperature of the drying oven is maintained at about 40° C., and after a solvent in the working medium slurry is completely volatilized, a solidified working medium target tape is obtained.

Test of plasma treatment effect:

A variation of surface tension of a transparent PET film before and after treatment is tested by means of a dyne liquid, and the surface tension of the transparent PET film subjected to the low-temperature plasma treatment may be increased from less than 40 dynes to 70 dynes or above.

Embodiment 2 Variation representation of PET substrate of target tape before and after plasma treatment 1. A contact angle between a liquid GAP mixed solution and substrate PET is measured by a contact angle measuring instrument (POWEREACH JC2000D3, Shanghai Zhongcheng Technology Co., Ltd.).

Figure 5A:
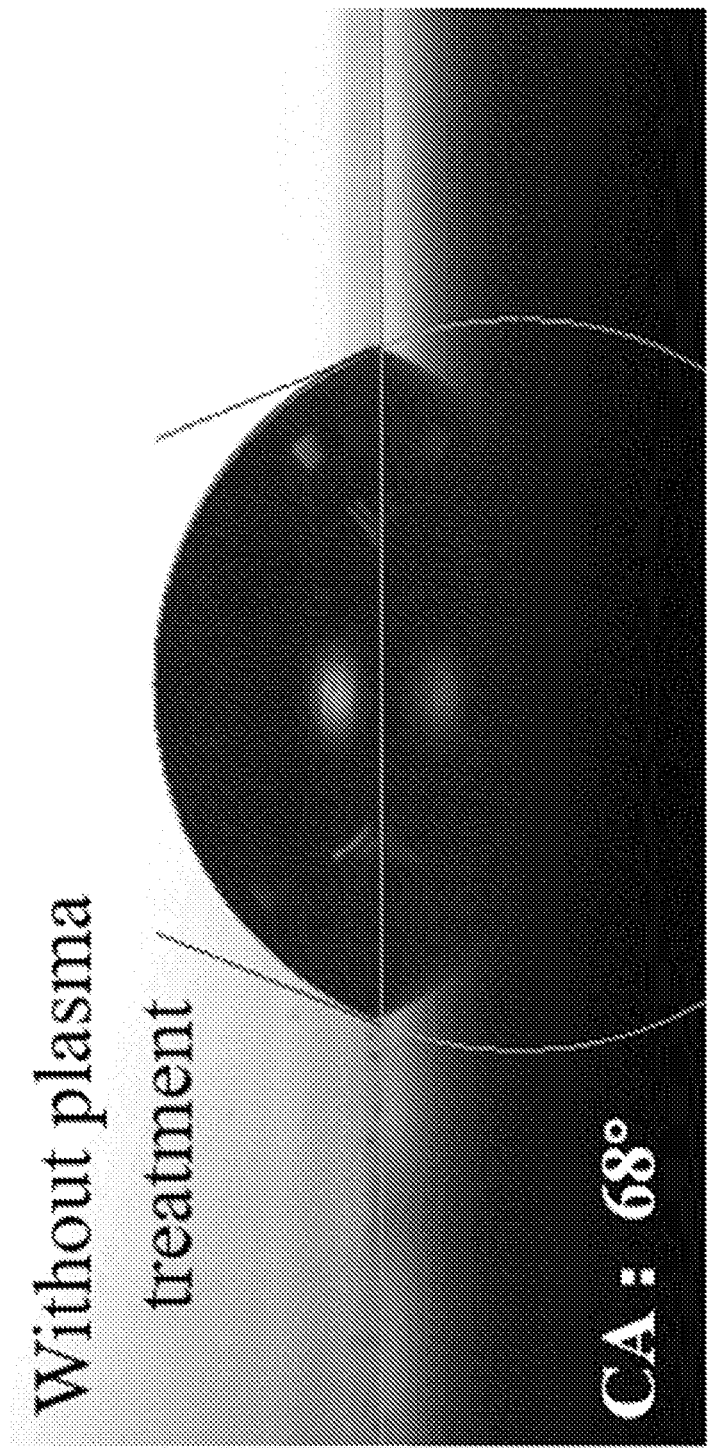
Figure 5B:
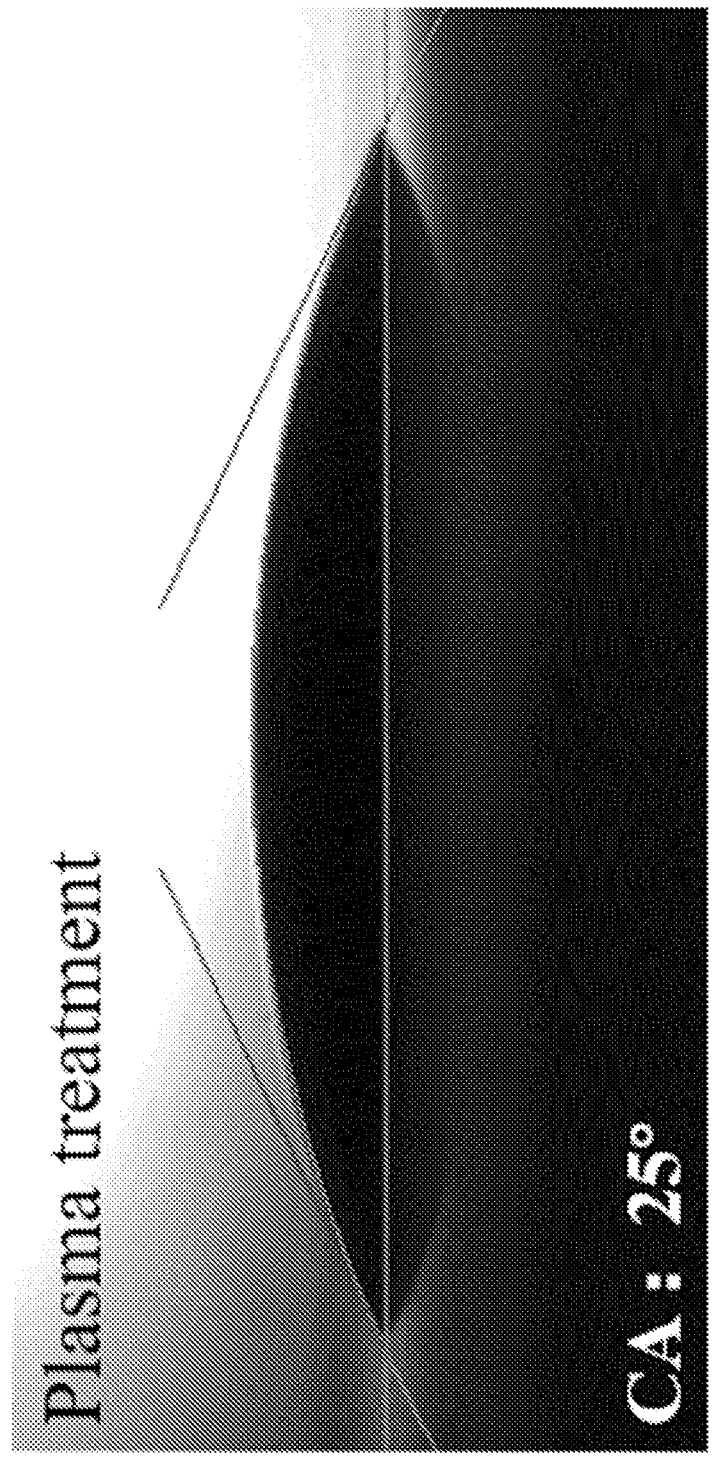

Measurement results are as shown in FIGS. 5A-5B. A contact angle between PET and a liquid GAP mixture that are not subjected to plasma treatment is about 68 degrees. A contact angle between PET and liquid GAP that are subjected to plasma treatment is about 25 degrees. It can be found that the contact angle between the PET and the liquid GAP that are subjected to plasma treatment is remarkably decreased. It is indicated that wettability of a PET surface subjected to plasma treatment is remarkably improved.

2. Flatness of a surface of a PET film before and after plasma treatment is scanned by an atomic force microscope (AFM).

Figure 6A:
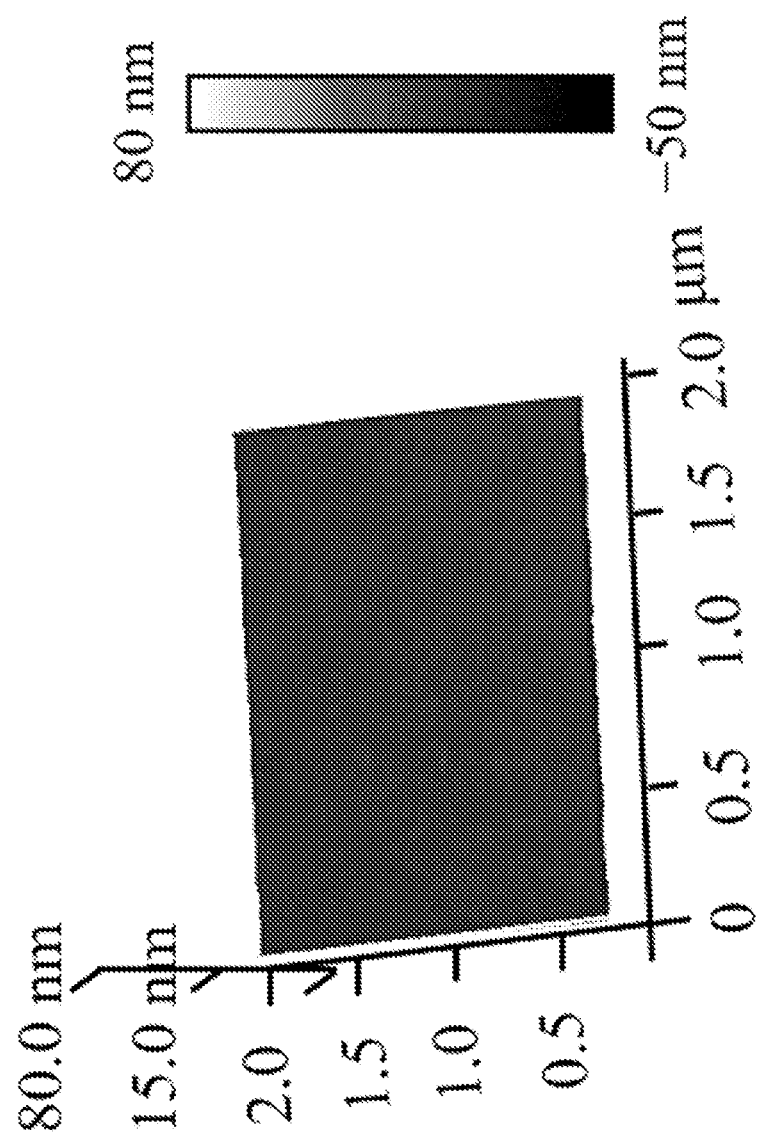
Figure 6B:
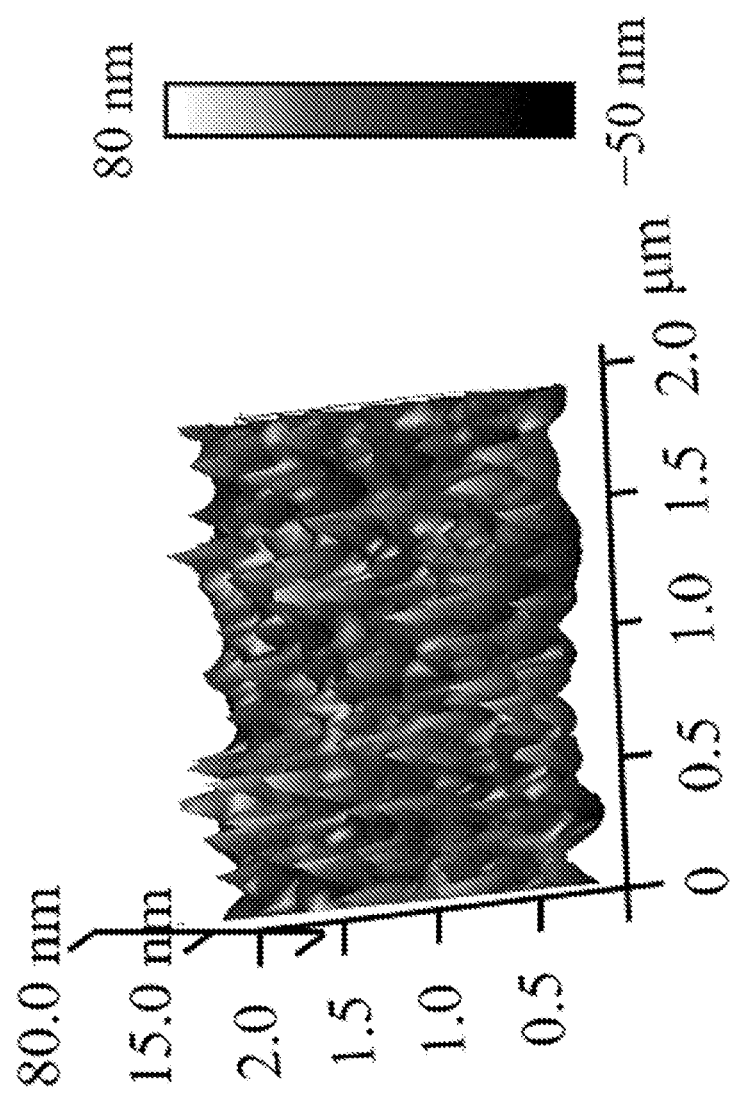
Figure 7A:
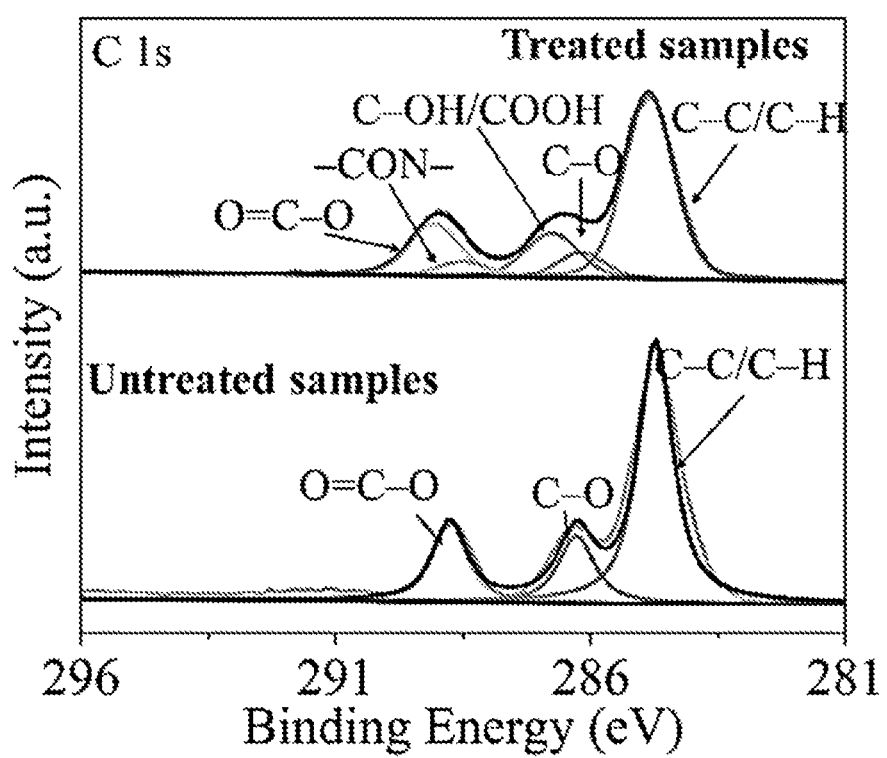
Figure 7B:
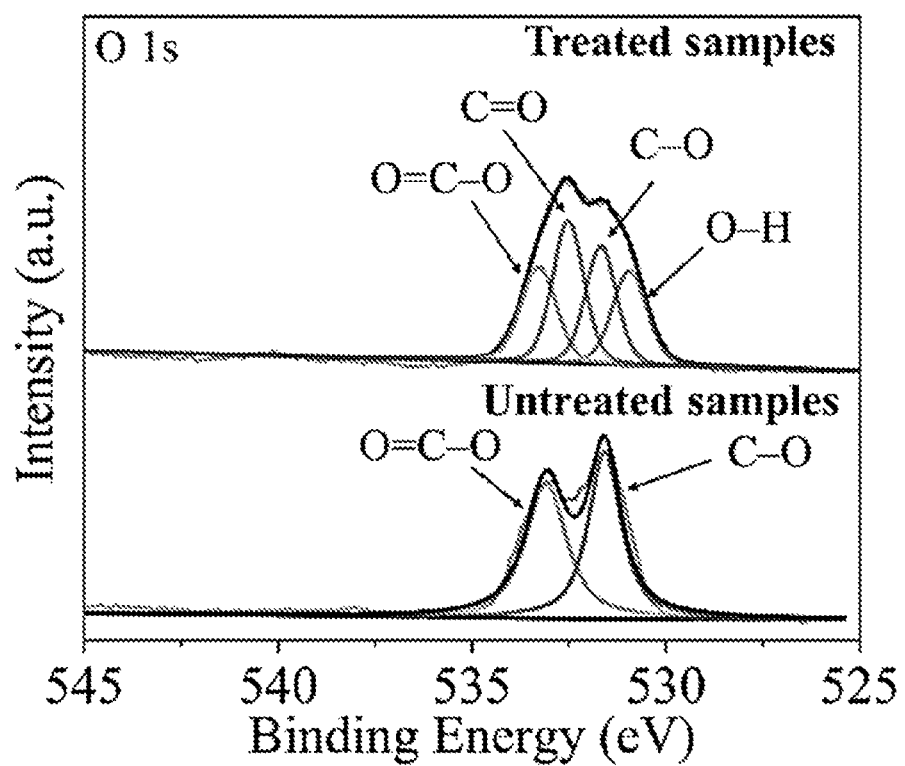
Figure 7C:
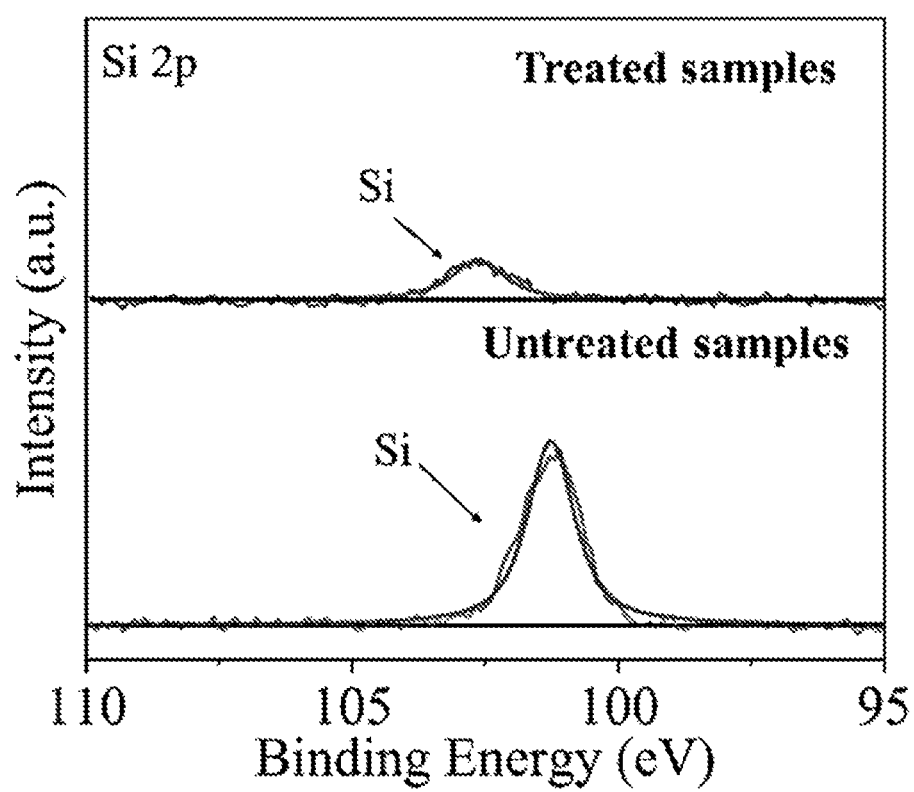
Figure 7D:
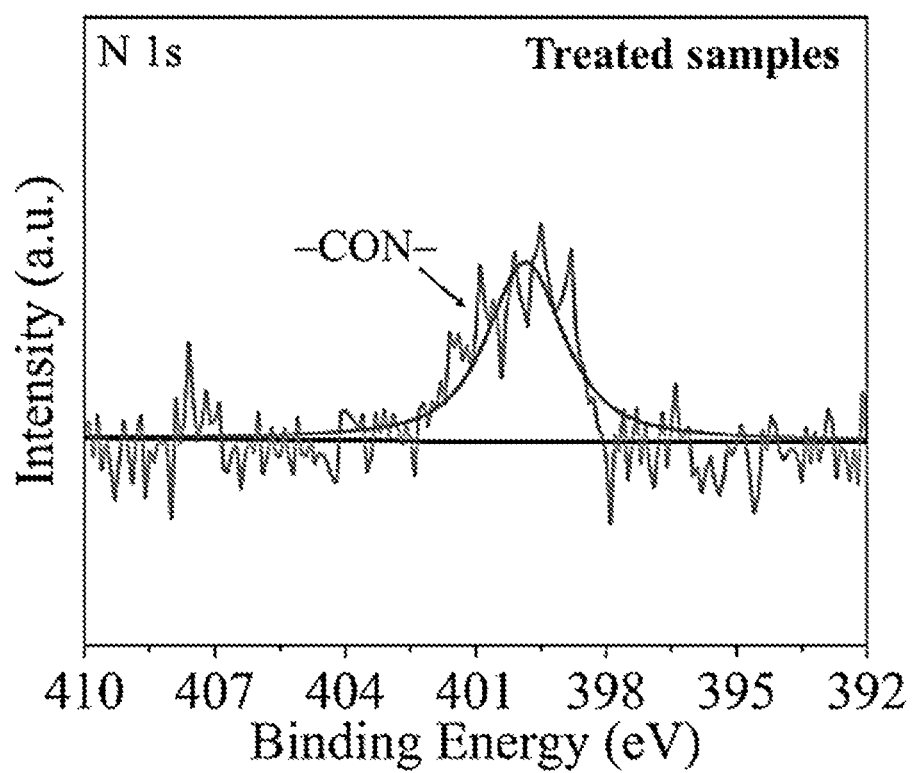

A given result of an AFM represents a mean of at least five times of repeated measurement. Test results are as shown in FIGS. 6A-6B. Surface morphology of PET is observed by means of the AFM, and a mean and root mean square of surface roughness are obtained, which are as shown in Table 1. Surface roughness Ra of PET not subjected to plasma treatment is about 1.45 nm, and root mean square Rq is about 1.74 nm. Surface roughness Ra of PET subjected to plasma treatment is about 14.30 nm, and root mean square value Rq is about 19.10 nm. It can be seen from the figure that a PET surface not subjected to plasma pretreatment is smooth and flat, and the surface roughness is low. A PET surface subjected to plasma treatment becomes rough, and plenty of conical protrusions appear. It is indicated that the PET surface is eroded through ion and electron bombardment in a plasma treatment process. An increase in surface roughness increases a contact area between PET and GAP. Therefore, adhesive performance of PET is improved, and a bonding force of a double-layer target tape is enhanced.

TABLE 1

Test results of AFM

| Sample name | Ra nm | Rq nm |
| --- | --- | --- |
| Sample not subjected to plasma treatment | 1.45 (±0.22) | 1.74 (±0.39) |
| Sample subjected to plasma treatment | 14.30 (±5.86) | 19.10 (±6.34) |

3. A monochromatic x-ray of an aluminum anode (hv=1486.6 eV) is subjected to x-ray photoelectron spectroscopy (XPS) analysis by means of a thermodynamic K-α type x-ray photoelectron spectroscopy (XPS, Thermo Fisher Scientific, Waltham, MA, USA). An energy step is 0.100 eV, and on-state energy is 20.0 eV. Peaks were fitted by software 'XPS Peak'.

XPS representation results are as shown in FIGS. 3, 4 and 7A-7D and Tables 2 and 3.

TABLE 2

Test results of AFM

| | PET | | | |
| --- | --- | --- | --- | --- |
| Sample name | C 1s at % | O 1s at % | N 1s at % | Si 1s at % |
| Sample not subjected to plasma treatment | 68.21 | 28.03 | — | 2.77 |
| Sample subjected to plasma treatment | 65.47 | 32.49 | 1.16 | 0.88 |

From FIGS. 3, 4 and 7A-7D and tables 2 and 3, it can be seen that a N 1 s element most varies, and an atomic concentration thereof is increased from 0% to 1.16%. The reason is that after plasma treatment, a small quantity of N is absorbed by a surface of a PET sample in a form of a —CON— group. At the same time, after plasma treatment, a content of a C is element is decreased, and a content of a 0 is element is increased. By fitting a C is spectrum of PET subjected to plasma treatment, it can be found that a bonding energy peak corresponds to O═C—O (289.00 eV), C—OH/COOH (286.70 eV), C—O (286.12 eV), CON (288.44 eV) and C—C/C—H (284.80 eV). A variation of chemical composition of C 1s is as shown in Table 3. Compared with a C is spectrum before plasma treatment, the novel spectrum shows that a large quantity of C—OH/COOH bonds appear after plasma treatment. It is indicated that after plasma treatment, a C═O bond is disconnected from a PET surface, and a new bond is formed. C—O and C—C/C—H peaks shift rightwards (about 0.02 eV), and a O═C—O peak shifts rightwards (about 0.11 eV). It is indicated that electron transfer occurs in a process of forming a C—OH/COOH bond in a sample subjected to plasma treatment, which means that a valence state of free ions on the PET surface varies. The existence of the C—OH/COOH bond greatly enhances adhesion of PET.

When a O is spectrum is fitted, it is found that C═O and O—H bonds appear after plasma treatment. After plasma treatment, C═O bonds and O—H bonds appear on the surface of the sample, and there are more oxygen-containing groups. O═C—O and O—C peak positions slightly shift due to the formation of new chemical bonds. The O—H bonds may come from water vapor, and in a plasma treatment process, the O—H bonds are slowly formed on the PET surface. Accordingly, when a sample is treated with a plasma, $CO_2$ in the air dissociates, thereby forming a C=O bond. The formation of two C=O bonds and a O—H bond enhance wettability of the PET surface to different degrees. In general, plasma treatment of the PET surface will introduce a large quantity of free radicals. In addition, they further contribute to enhancement of an adhesive force between high-energy polymers and PET. When a Si 2p spectrum is fitted, it is found that a concentration of a Si 2p element is decreased from 2.77% to 0.88%. There is no Si element in PET, but in order to enhance lubricity between tapes, in factories, the PET surface is coated with Si. Therefore, after plasma treatment, Si element is reduced, lubrication between the tapes is reduced, and the adhesive force is further enhanced.

TABLE 3

Variations of chemical composition of C 1s element

| Bonding energy (eV) | Proportion (%) of samples not subjected to plasma treatment | Proportion (%) of samples subjected to plasma treatment | Possible functional groups |
| --- | --- | --- | --- |
| 289.00 | 19.09 | 16.25 | O=C—O |
| 286.70 | — | 14.69 | C—OH/COOH |
| 286.12 | 17.15 | 7.45 | C—O |
| 288.44 | — | 4.77 | CON |
| 284.80 | 63.76 | 56.84 | C—C/C—H |

Figure 8A:
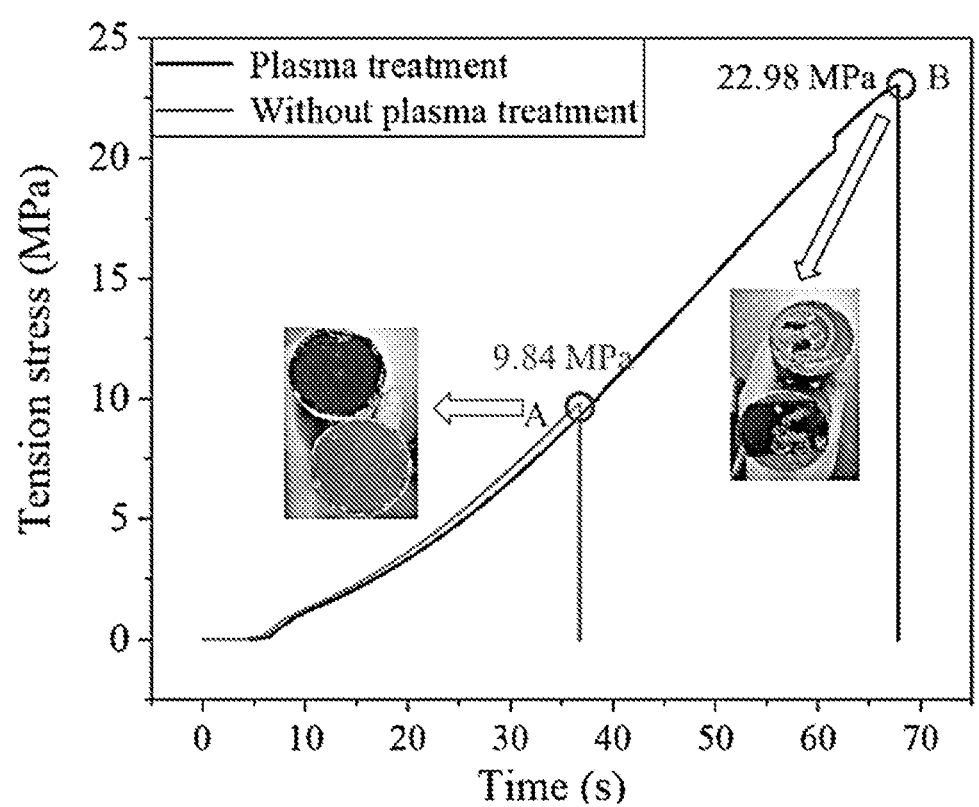
FIG. 8A illustrates Measurement results of tension stress. Adhesion between PET and GAP before and after plasma treatment is represented by a red line and a black line respectively. Tension stress at a point A is about 9.84 MPa, and a result of tensioning a double-layer tape is indicated by an arrow at the point A. Tension stress at a point B is about 22.98 MPa, a result of a double-layer tape: a tensioned double-layer tape is indicated by an arrow at the point B.
Figure 8B:
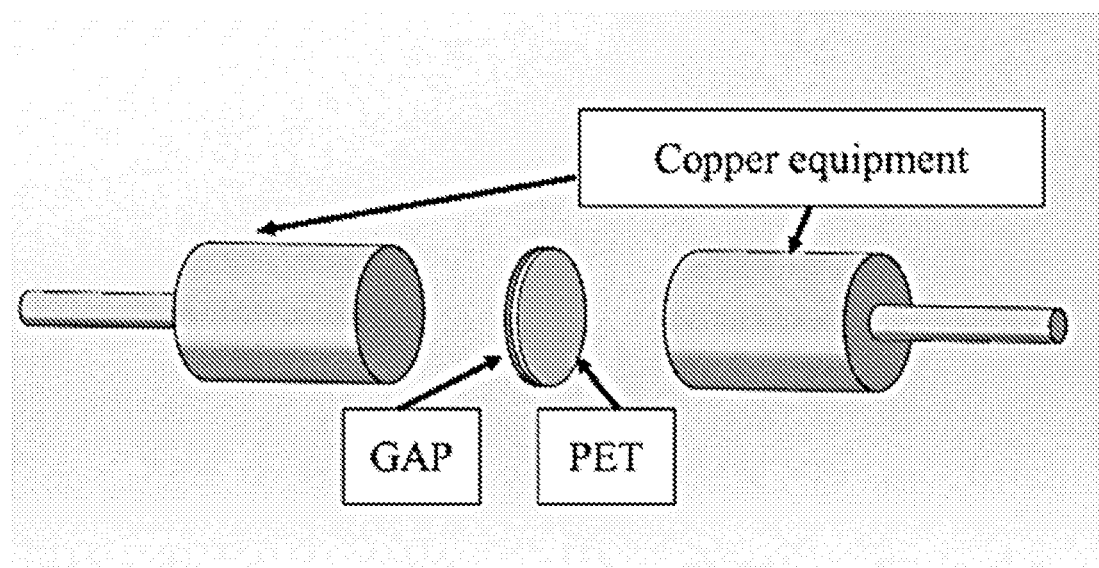
FIG. 8B illustrates a Three-dimensional schematic diagram of tensile samples.
Figure 8C:
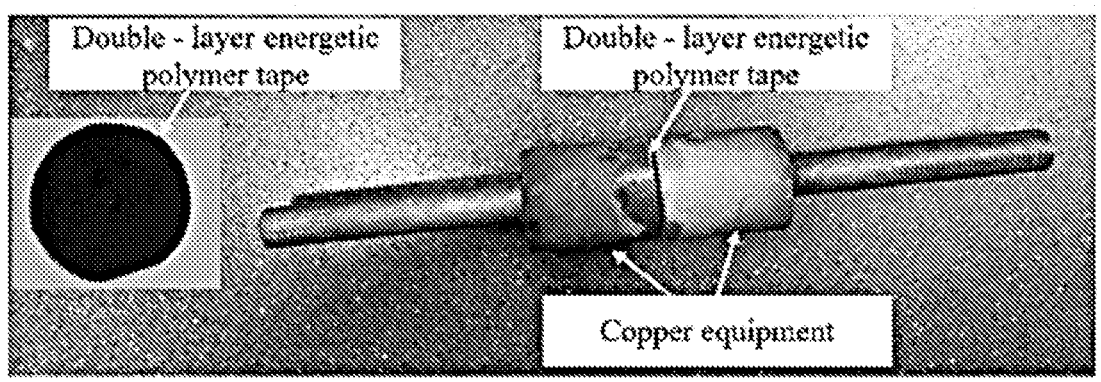
FIG. 8C illustrates a Physical picture of tensile samples.

4. Test of bonding force:

In order to test a bonding force between a fuel layer and a substrate layer of a target tape before and after plasma treatment, a bonding force of the target tape is measured by an electronic tensile tester QBD-100 (Jinan Fangyuan Test instrument Co., Ltd., Jinan, China), and a tensile speed is 0.5 mm/min A sample for a tensile test is a double-layer target tape having a diameter of 20 mm, and the double-layer target tape is composed of PET having a thickness of 100 μm and GAP having a thickness of 100 μm. Two identical copper tensile moldes are attached to two surfaces of a double-layer tape by a super glue (Adbest two-component epoxy adhesive manufactured by Shanghai Huayi Resin Co., Ltd.), stress results are as shown in FIG. 8A, and tensile samples are as shown in FIGS. 8B-8B. It can be seen from figures that tension stress without plasma treatment is about 9.84 MPa, which is as shown at a point A. After plasma treatment, the tension stress is about 22.98 MPa, which is as shown at a point B in the figure. The tension stress is increased by about 133.5%. By comparing joint surfaces after a mold is pulled apart, it can be found that GAP and PET are completely separated without plasma treatment, leaving no residual components. However, after plasma treatment, the GAP and PET are not completely separated. A small quantity of residue remained on the PET surface. It is indicated that an adhesive force of the PET surface after plasma treatment is remarkably enhanced.

Figure 9:
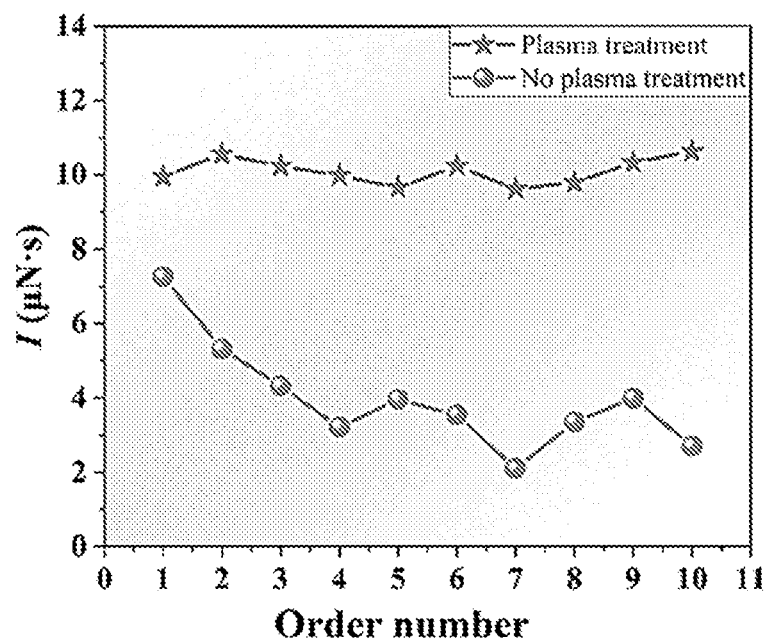
FIG. 9: Comparison of impulses of single pulse of ten times of consecutive lase ablation

In order to compare variations of performance of a target tape before and after plasma treatment, variations of impulses of a single pulse of laser ablation are measured ten times by a torsional pendulum system. A laser pulse width is 200 μs, an ablation pit interval is about 800 μm, and an impulse of a single pulse is continuously measured ten times, and results are as shown in FIG. 9. In the figure, a dot curve is a result without plasma treatment, and an asterisk curve is a result after plasma treatment. It can be seen from the figure that impulses of a single pulse of a target tape subjected to plasma treatment is more stable and less volatile. An impulse value of the single pulse of the target tape not subjected to plasma treatment is remarkably decreased and is extremely unstable. The reason is that adhesion of the target tape not subjected to plasma treatment is not well, and GAP is separated from PET in a laser ablation process. There are two reasons for a decrease in the impulse values of the single pulse due to separation of GAP and PET. One reason is that separation of GAP and PET results in laser defocusing, which greatly reduces laser power density and ablation efficiency. Another reason is that after separation, there is a lack of a bottom support when a plume is sprayed, such that a force generated by laser ablation of the GAP may not fully transferred to the PET. Stability of impulses of a single pulse is the premise of ensuring thrust stability of a micro thruster for laser ablation. In a continuous ablation process, a separation phenomenon not only decreases mean thrust, but also leads to thrust instability, thus affecting mission execution of a micro-nano satellite.

5. Sectional views of an ablation pit before and after plasma treatment are observed by a scanning electron microscope (SEM).

Figure 10A:
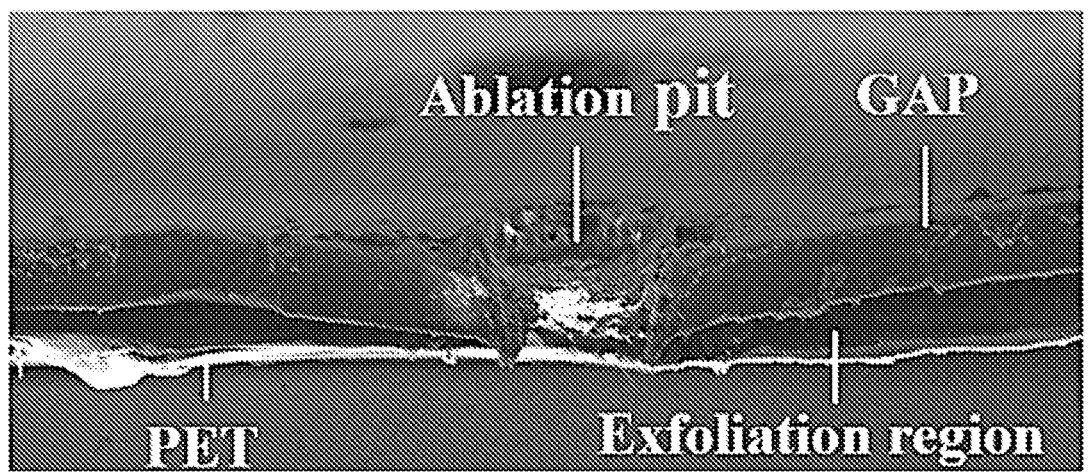
Figure 10B:
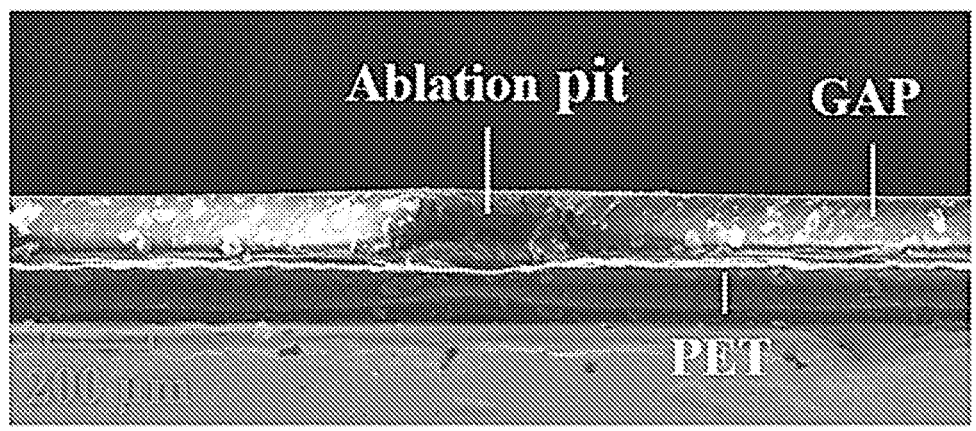

FIG. 10A is a sectional view of an ablation pit of a target tape not subjected to plasma treatment, and FIG. 10B is a sectional view of an ablation pit subjected to plasma treatment. A laser pulse width is 200 μs. It can be seen from the figure that there is a large separation region around the ablation pit of the target tape not subjected to plasma treatment, while no separation phenomenon is found around the ablation pit after plasma treatment. It is indicated that an adhesive force between a fuel layer and a substrate of a target tape is remarkably increased after plasma treatment.

What is described above is only several embodiments of the present disclosure, and is not intended to limit the present disclosure in any form. Although the present disclosure is disclosed above with preferred embodiments, it is not intended to limit the present disclosure. Any change or modification made by those skilled in the art using the technical content disclosed above without departing from the scope of the technical solution of the present disclosure is equivalent to an equivalent embodiment, and all fall within the scope of the technical solution.

What is claimed is:

1. A plasma treatment based preparation method for a working medium target tape for a micro laser thruster, comprising the following steps:
    step 1) treating a surface of a transparent polymer film substrate by a plasma; and
    step 2) coating the surface of the transparent polymer film substrate subjected to the plasma treatment with working medium slurry;
    the transparent polymer film substrate is a polyethylene terephthalate film or a polyimide film.

2. The plasma treatment based preparation method for a working medium target tape for a micro laser thruster according to claim 1, wherein the surface of the transparent film substrate is coated with the working medium slurry within 5 s after being subjected to the plasma treatment.

3. The plasma treatment based preparation method for a working medium target tape for a micro laser thruster according to claim 1, wherein the transparent polymer film substrate is a polymer film with a single surface coated with silicon; in the step 1), the surface not coated with the silicon of the transparent polymer film substrate is treated by the plasma;

the transparent polymer film substrate has a thickness ranging from 20 μm to 200 μm; and the transparent polymer film substrate has a width ranging from 5 cm to 15 cm.

4. The plasma treatment based preparation method for a working medium target tape for a micro laser thruster according to claim 1, wherein in the step 1), the transparent polymer film substrate is subjected to cleaning pretreatment;

the cleaning pretreatment is to clean the surface of the transparent polymer film substrate with ethanol, and after being air-dried, the transparent polymer film substrate is dried at a temperature ranging from 40° C. to 50° C. for later use; and in the step 2), after coating is completed, the slurry is dried at a temperature ranging from 40° C. to 50° C.

5. The plasma treatment based preparation method for a working medium target tape for a micro laser thruster according to claim 1, wherein the plasma is made from at least one of air, argon, nitrogen or oxygen.

6. The plasma treatment based preparation method for a working medium target tape for a micro laser thruster according to claim 1, wherein low-temperature plasma treatment power ranges from 1000 W to 2000 W; a transparent polymer film substrate transmission speed ranges from 1 m/min to 4 m/min; and a gas pressure ranges from 80 kPa to 120 kPa, and a low-temperature plasma treatment region has an area ranging from 150 cm$^2$ to 400 cm$^2$.

\* \* \* \* \*